UNITED STATES PATENT OFFICE.

HORACE WILLIAMS AND JOHN L. ALBERGER, OF BUFFALO, NEW YORK.

METHOD OF TREATING GRAPE-SUGAR OR GLUCOSE FOR THE PURPOSE OF REFINING THE SAME.

SPECIFICATION forming part of Letters Patent No. 247,455, dated September 20, 1881.

Application filed July 29, 1881. (No specimens.)

*To all whom it may concern:*

Be it known that we, HORACE WILLIAMS and JOHN L. ALBERGER, of Buffalo, in the county of Erie and State of New York, have jointly invented a new and useful Method of Treating Grape-Sugar or Glucose for the Purpose of Refining the Same; and we do hereby declare the following to be a description of our said invention in such full, clear, concise, and exact terms as to enable any one skilled in the arts to which it appertains, or with which it is most nearly connected, to work or practice the same.

The object of our invention is the refinement of grape-sugar or glucose; and it consists of a novel method of treating grape-sugar or glucose made of grain or any other amylaceous substances, for the purpose of producing an amylaceous sugar that resembles cane-sugar in flavor, taste, and color.

Our invention begins with the treatment of the sugar after saccharification. The treatment and result are as follows: First, we crystallize and treat the sugar substantially as described in our Letters Patent of the United States No. 241,903, dated May 24, 1881, and obtain the sirup and hard cake of sugar resulting from the process of that patent, and which we call "amyl sugar;" second, we take the expressed liquor or sirup from the press and concentrate it in the vacuum-pan to a consistency of from 37° to 41° of Baumé, and this liquor we run into suitable tubs or tanks and put into it a small quantity of any well-known fermentative, or let it stand until it ferments without the addition of any chemicals; third, we ferment the sirup to destroy or eliminate its bitter element and taste, and during and after the fermentation a portion of the sirup crystallizes and falls to the bottom of the tank or tub; fourth, we take this sirup after fermentation, and the crystallized sugar contained in it, and put it in bags and press out the liquor and sirup with a hydraulic press, or throw it out with a centrifugal.

The sugar thus produced we call "amyl cane-sugar." It is sweet and has a grain and flavor very similar to sugar produced from cane, and the sirup, which we reduce in the vacuum-pan to about 41° of Baumé, will be found to have the color, flavor, and taste of cane-sirup.

Instead of crystallizing and pressing out a portion of the sugar after it comes from the vacuum-pan, as described in our patent aforesaid, No. 241,903, before fermentation, the whole mass may be set to fermenting and crystallizing, in which case the density of the sirup coming from the vacuum-pan should be about 30° to 35° of Baumé, the subsequent treatment being the same as above described for the sirup after fermentation.

In the treatment of what is known in the United States as "glucose"—that is, a liquid substance composed of grape-sugar and gum—we proceed at once to expose the mass under treatment to fermentation at a gravity of from 30° to 35° of Baumé; then remove the scum, which will arise to the top of the containing-vessel, stopping the fermentation by boiling in the vacuum-pan to 41° Baumé, when the glucose under treatment will have the taste of cane-sugar molasses, and the distinctive bitter taste will be greatly modified or wholly eliminated.

Having thus described our invention, we claim—

1. The method substantially herein described of refining grape-sugar or glucose, which method consists of fermenting the liquid mass after it leaves the vacuum-pan, and of pressing or throwing the liquid portions out of it after crystallization and fermentation.

2. The method substantially herein described of refining grape-sugar, which method consists of eliminating its bitter element by fermentation after saccharification.

3. The method substantially herein described of refining sirup drained from sugar made from grain or other amylaceous substances, which method consists of eliminating the impurities by fermenting the liquor and sugar after saccharification, substantially as described.

HORACE WILLIAMS.
JOHN L. ALBERGER.

Witnesses:
PHILIP KIMPEL,
F. S. MILLER, Jr.